(12) United States Patent
Yu et al.

(10) Patent No.: US 12,271,650 B2
(45) Date of Patent: Apr. 8, 2025

(54) DISPLAY APPARATUS AND SPLICE DISPLAY SYSTEM

(71) Applicant: BOE TECHNOLOGY GROUP CO., LTD., Beijing (CN)

(72) Inventors: Chao Yu, Beijing (CN); Jian Wu, Beijing (CN); Quanzhong Wang, Beijing (CN); Junmin Sun, Beijing (CN); Lu Xiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/268,648

(22) PCT Filed: Mar. 8, 2022

(86) PCT No.: PCT/CN2022/079683
§ 371 (c)(1),
(2) Date: Jun. 21, 2023

(87) PCT Pub. No.: WO2022/267551
PCT Pub. Date: Dec. 29, 2022

(65) Prior Publication Data
US 2024/0296004 A1       Sep. 5, 2024

(30) Foreign Application Priority Data

Jun. 25, 2021   (CN) .......................... 202110715741.8

(51) Int. Cl.
*G09G 3/14* (2006.01)
*G06F 3/14* (2006.01)
*G09G 3/32* (2016.01)

(52) U.S. Cl.
CPC ............ *G06F 3/1446* (2013.01); *G09G 3/32* (2013.01); *G09G 2300/026* (2013.01)

(58) Field of Classification Search
CPC ... G06F 3/1446; G09G 3/32; G09G 2300/026
See application file for complete search history.

(56) References Cited

U.S. PATENT DOCUMENTS

2020/0019018 A1*   1/2020   Xu ..................... G02F 1/133606
2021/0041718 A1*   2/2021   Balogh .................... H01L 33/58

FOREIGN PATENT DOCUMENTS

CN          101493206 A     7/2009
CN          201934941 U     8/2011
(Continued)

*Primary Examiner* — Gene W Lee
(74) *Attorney, Agent, or Firm* — HOUTTEMAN LAW LLC

(57) ABSTRACT

A display apparatus and a splice display system are disclosed. The display apparatus includes: a lamp panel, which includes a circuit board and a plurality of light-emitting elements on the circuit board; and a mask on side of the plurality of light-emitting elements away from the circuit board, where the mask includes a plurality of light-transmitting parts corresponding to the plurality of light-emitting elements, an orthographic projection of each of the plurality of light-emitting elements on the circuit board is within an orthographic projection of a corresponding light-transmitting part on the circuit board, each of the plurality of light-transmitting parts includes a concave lens, and a surface of the concave lens close to the light-emitting element is a concave arc surface.

18 Claims, 5 Drawing Sheets

(56) References Cited

FOREIGN PATENT DOCUMENTS

| | | |
|---|---|---|
| CN | 203384787 U | 1/2014 |
| CN | 205229510 U | 5/2016 |
| CN | 105654860 A | 6/2016 |
| CN | 109509405 A | 3/2019 |
| CN | 110047407 A | 7/2019 |
| CN | 211399574 U | 9/2020 |
| CN | 211529526 U | 9/2020 |
| JP | H09114401 A | 5/1997 |

* cited by examiner

DISPLAY APPARATUS AND SPLICE DISPLAY SYSTEM

TECHNICAL FIELD

The present disclosure relates to the field of display technology, and in particular, to a display apparatus and a splice display system.

BACKGROUND

A splice display system may be used in a large-scale performance, where the splice display system includes a plurality of independent display apparatuses, and the playing contents of all the display apparatuses are spliced together to form a complete video. The large-size splice display system may be used as a wall screen, a floor screen, or the like.

SUMMARY

The present disclosure provides a display apparatus and a splice display system.

In a first aspect, an embodiment of the present disclosure provides a display apparatus, including:
- a lamp panel, which includes a circuit board and a plurality of light-emitting elements on the circuit board; and
- a mask on side of the plurality of light-emitting elements away from the circuit board, where the mask includes a plurality of light-transmitting parts corresponding to the plurality of light-emitting elements, an orthographic projection of each of the plurality of light-emitting elements on the circuit board is within an orthographic projection of a corresponding light-transmitting part on the circuit board, each of the plurality of light-transmitting parts includes a concave lens, and a surface of the concave lens close to the light-emitting element is a concave arc surface.

In some embodiments, the light-emitting element is on an optical axis of the concave lens.

In some embodiments, a first spacing exists between centers of every two adjacent light-emitting elements, a distance between the light-emitting element and the light transmitting part in a direction of the optical axis is ⅓ to ⅔ of the first spacing, and a curvature of the arc surface is 1 to 2 times of the first spacing.

In some embodiments, the first spacing between the centers of every two adjacent light-emitting elements is in a range of 12 mm to 18 mm, the distance between the light-emitting element and the light-transmitting part in the direction of the optical axis is in a range of 5 mm to 10 mm, and the curvature of the arc surface is in a range of 18 mm to 22 mm.

In some embodiments, a scattering particle material is doped inside the light-transmitting part.

In some embodiments, the plurality of light-transmitting parts of the mask are in a plurality of rows and a plurality of columns, centers of four light-transmitting parts in any two adjacent rows and any two adjacent columns define a first region, and a light-condensing structure at a position of a center of at least one of the first regions, and the light-condensing structure is configured to reflect and/or refract light for multiple times.

In some embodiments, the light-condensing structure includes at least one light-condensing hole in the mask.

In some embodiments, the plurality of light-transmitting parts are formed into a one-piece structure.

In some embodiments, the display apparatus further includes:
- a bottom housing, where the bottom housing is fixedly connected to the mask, and the lamp panel is between the bottom housing and the mask; and
- a support structure supporting between the mask and the bottom housing, where the circuit board is provided with a avoiding hole corresponding to the support structure, and the support structure passes through the avoiding hole.

In some embodiments, the support structure includes:
- a support column, where two ends of the support column are connected to the mask and the bottom housing, respectively; and
- a support sleeve, where the support column is sleeved by the support sleeve, one end of the support sleeve is connected to the bottom housing, and the other end of the support sleeve supports the mask.

In some embodiments, the mask is connected to the bottom housing through an adhesive.

In some embodiments, the bottom housing includes a bottom plate and a plurality of reinforcing ribs on the bottom plate.

In some embodiments, a surface of the mask away from the lamp panel is provided with an anti-slip structure, and the anti-slip structure includes a protrusion and/or a groove.

In some embodiments, the light-transmitting parts are in an array, and the anti-slip structure is arranged between any two adjacent rows of the light-transmitting parts and between any two adjacent columns of the light-transmitting parts.

In some embodiments, the anti-slip structure includes a groove having a width in a range of 0.2 mm to 0.4 mm and a depth in a range of 0.1 mm to 0.3 mm.

In a second aspect, an embodiment of the present disclosure further provides a splice display system, including a fixing plate and a plurality of display apparatuses on the fixing plate, the plurality of display apparatuses includes the display apparatus described above.

In some embodiments, one of the bottom housing of the display apparatus and the fixing plate is provided with a positioning pin, and the other of the bottom housing of the display apparatus and the fixing plate is provided with a positioning hole corresponding to the positioning pin, and the positioning pin is in the positioning hole.

In some embodiments, the plurality of light-emitting elements in each of the plurality of display apparatuses are divided into N number of groups, and N number of driving chips are on the circuit board in the display apparatus, each of the N number of driving chips is electrically connected to one group of light-emitting elements, and different driving chips are connected to different groups of light-emitting elements, respectively;

the splice display system further includes N number of control modules, an $i^{th}$ driving chip in each display apparatus is electrically connected to an $i^{th}$ control module, both of i and N are positive integers, N>1, and $i \leq 1 \leq N$;

where each of the N number of control modules is configured to receive an image signal and a power signal provided by a signal source, and to provide a control signal for each driving chip connected to the control module according to the image signal and the power signal; and the driving chip is configured to drive a corresponding light-emitting element to emit light according to the control signal received from the control module.

In some embodiments, the plurality of light-emitting elements in each of the plurality of display apparatuses are in an array, N is 2; a first group of light-emitting elements include light-emitting elements in odd-numbered rows and odd-numbered columns, and light-emitting elements in even-numbered rows and even-numbered columns; and a second group of light-emitting elements include light-emitting elements in odd-numbered rows and even-numbered columns, and light-emitting elements in even-numbered rows and odd-numbered columns.

In some embodiments, a connector is further on the circuit board, each of the N number of driving chips is connected to a corresponding control module through the connector, and a through hole is in a bottom housing of the display apparatus, at least a part of the connector is in the through hole, and a sealing ring is between the connector and an inner wall of the through hole.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. In the drawings.

DETAIL DESCRIPTION OF EMBODIMENTS

In order to make the objects, technical solutions and advantages of the embodiments of the present disclosure more apparent, the technical solutions of the embodiments of the present disclosure will be clearly and completely described below with reference to the drawings of the embodiments of the present disclosure. Obviously, the described embodiments are some, but not all, embodiments of the present disclosure. All other embodiments, which can be derived by one of ordinary skill in the art from the described embodiments of the present disclosure without creative efforts, are within the protection scope of the present disclosure.

The term used herein to describe embodiments of the present disclosure is not intended to limit and/or define the scope of the present disclosure. For example, unless otherwise defined, a technical or scientific term used herein shall have the ordinary meaning as understood by one of ordinary skill in the art to which the present disclosure belongs. It should be understood that the terms "first", "second", and the like, as used in the present disclosure, do not denote any order, quantity, or importance, but rather are used to distinguish one element from another. The singular form "a", "an", or "the" and the like does not denote a limitation of quantity, but rather denotes the presence of at least one, unless the context clearly dictates otherwise. The word "comprising" or "comprises", and the like, means that the element or item appearing in front of the word "comprising" or "comprises" includes the element or item listed after the word "comprising" or "comprises" and its equivalents, and does not exclude other elements or items. The term "connected" or "coupled" and the like is not restricted to a physical or mechanical connection, but may include an electrical connection, whether direct or indirect.

The splice display system includes a plurality of display apparatuses capable of displaying independently, and the display contents of all the display apparatuses are spliced together to form a complete video. The splice display system may be used in an indoor display scene and an outdoor display scene (e.g., a large-scale performance). Each display apparatus in the splice display system may be an LED display apparatus, that is, an LED device is arranged in each pixel region. In a splice display system for an indoor display, a spacing between LED devices is small; in splice display systems for an outdoor display, however, the spacing between LED devices is typically large, allowing the viewer to see the display at a distance. However, when the spacing between the LED devices is large, the image seen by the viewer is grainy.

Figure 1:
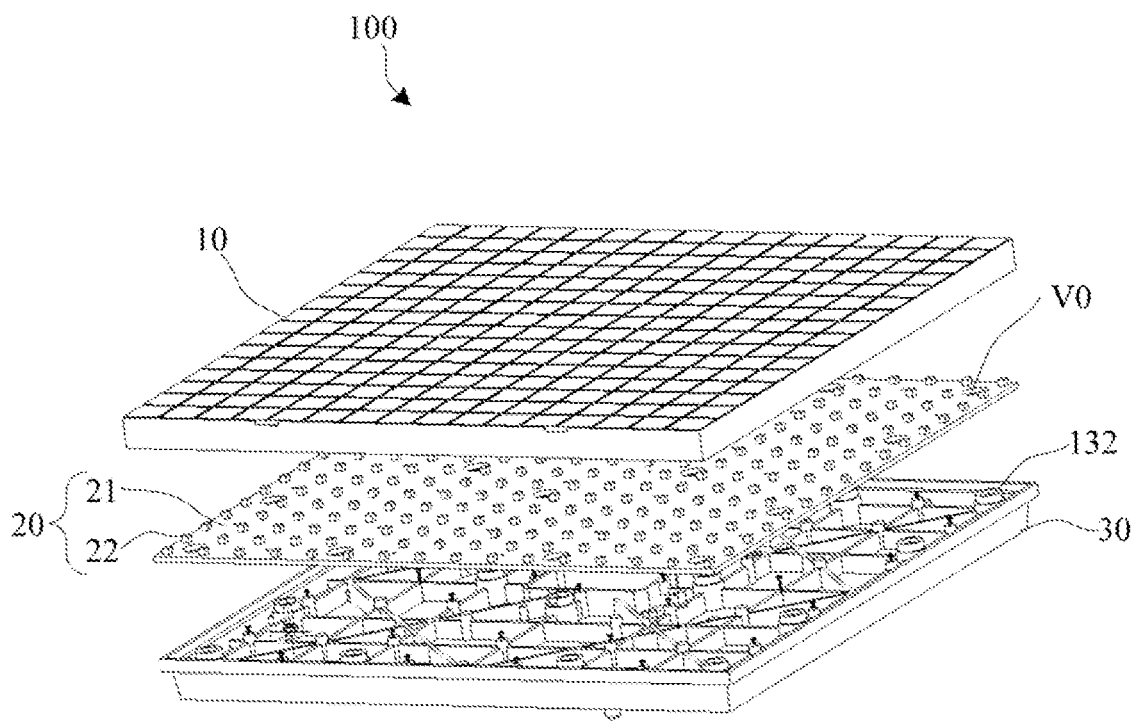
FIG. 1 is an exploded view of a display apparatus provided in some embodiments of the present disclosure.

FIG. 1 is an exploded view of a display apparatus provided in some embodiments of the present disclosure, and the display apparatus may be used in a large-size splice display system. As shown in FIG. 1, the display apparatus 100 includes a lamp panel 20 and a mask 10. The lamp panel 20 includes a circuit board 21 and a plurality of light-emitting elements 22 arranged on the circuit board 21. The circuit board 21 may include a base substrate and structures such as a driving chip, a signal line, and the like, which are arranged on the base substrate. The driving chip is connected to the light-emitting element 22 through the signal line and used for providing an electric signal for the light-emitting element 22 so as to drive the light-emitting element 22 to emit light with corresponding luminance. The display apparatus 100 may be divided into a plurality of pixel regions distributed in an array, each pixel region is provided with a light-emitting element 22, and the light-emitting element 22 is arranged in the middle of the pixel region. The light-emitting element 22 may be a Light-Emitting Diode (LED), for example, a Mini-LED or a Micro-LED. The plurality of light-emitting elements 22 can emit a plurality of colors (e.g., red, blue, green, and the like).

Figure 2:
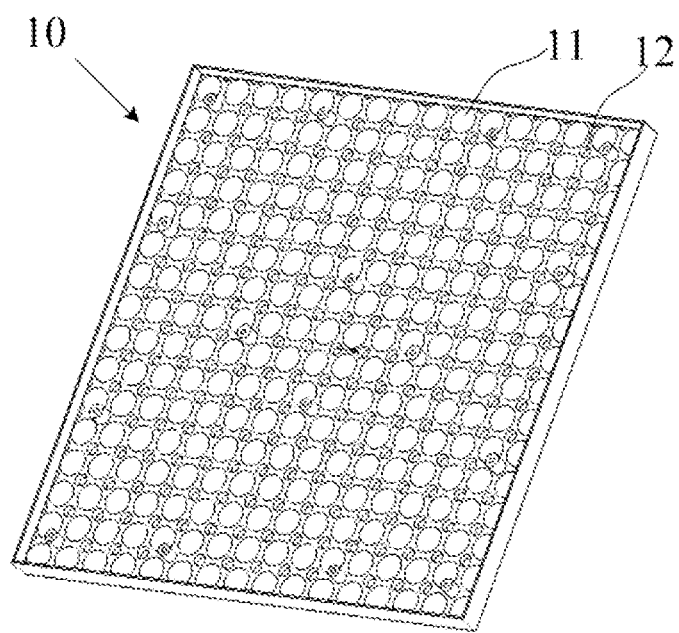
FIG. 2 is a front perspective view of a mask provided in some embodiments of the present disclosure.
Figure 3:
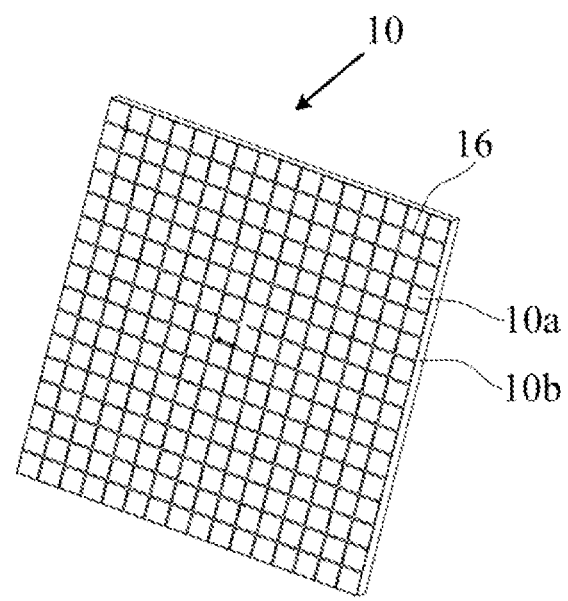
FIG. 3 is a rear perspective view of a mask provided in some embodiments of the present disclosure.
Figure 4:
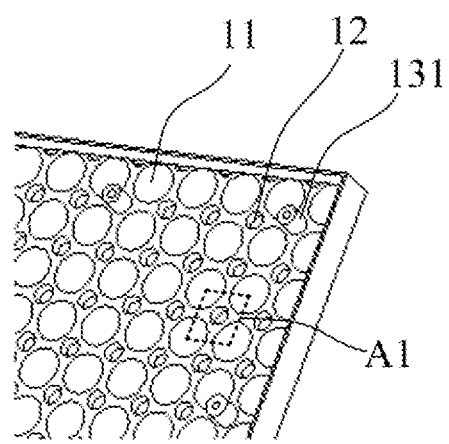
FIG. 4 is a diagram of a part of a mask provided in some embodiments of the present disclosure.
Figure 5:
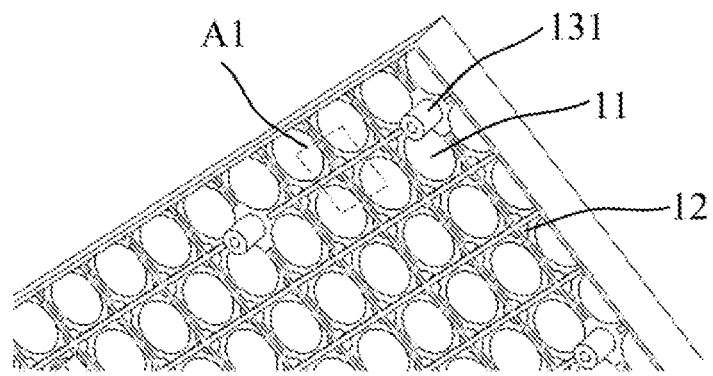
FIG. 5 is a diagram of a part of a mask provided in other embodiments of the present disclosure.
Figure 6:
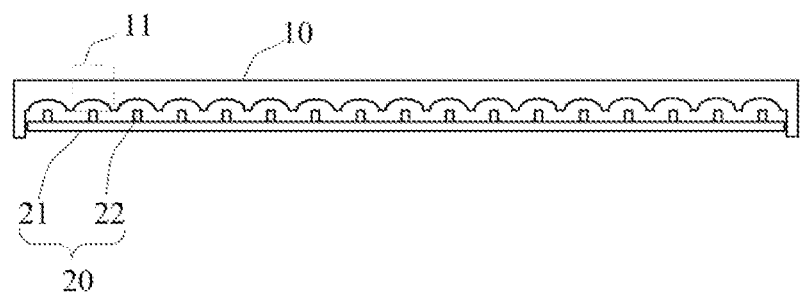
FIG. 6 is a cross-sectional view of a mask and a lamp panel provided in some embodiments of the present disclosure.

FIG. 2 is a front perspective view of a mask provided in some embodiments of the present disclosure. FIG. 3 is a rear perspective view of a mask provided in some embodiments of the present disclosure. FIG. 4 is a diagram of a part of a mask provided in some embodiments of the present disclosure. FIG. 5 is a diagram of a part of a mask provided in other embodiments of the present disclosure. FIG. 6 is a cross-sectional view of a mask and a lamp panel provided in some embodiments of the present disclosure. Referring to FIGS. 1 to 6, the mask 10 is arranged on a side of the plurality of light-emitting elements 22 away from the circuit board 21, the mask 10 includes a plurality of light-transmitting parts 11, and the light-transmitting parts 11 correspond to the light-emitting elements 22. Here, "the light-transmitting parts 11 correspond to the light-emitting elements 22" may be that the light-transmitting parts 11 are in a one-to-one correspondence with the light-emitting elements 22, or that each light-transmitting part 11 corresponds to a plurality of light-emitting elements 22, and different light-transmitting parts 11 correspond to different light-emitting elements 22. Preferably, the light-transmitting parts 11 are in a one-to-one correspondence with the light-emitting elements 22, that is, each light-emitting element 22 corresponds to one light-transmitting part 11, different light-emitting elements 22 correspond to different light-transmitting parts 11, and an orthographic projection of the light-emitting element 22 on the circuit board 21 is within an orthographic projection of the light-transmitting part 11 on the circuit board 21. The light-transmitting part 11 includes a concave lens, and a surface of the concave lens close to the light-emitting element 22 is a concave arc surface. In one example, a surface of the light-transmitting part 11 close to the light-emitting element 22 is a concave arc surface, so that the light-transmitting part 11 itself is formed as a concave lens.

In an embodiment of the present disclosure, the mask 10 includes the light-transmitting part 11 corresponding to the light-emitting element 22, and light-transmitting part 11 includes the concave lens, and the surface of the concave lens close to the light-emitting element 22 is the concave surface, so that when light emitted by light-emitting element 22 irradiates the concave lens, the light of light-emitting element 22 may be scattered by the concave lens, and the scattered light outgoes from the surface of the mask 10 away from the lamp panel 20, so that a light spot with a large area is formed on the mask 10 at a position corresponding to each light-emitting element 22, and then the image seen by the user is prevented from being grainy.

In some embodiments, the light-emitting element 22 is located on the optical axis of the concave lens, so that the light spots may more uniformly distributed on the mask 10.

In some embodiments, a first spacing exists between the centers of every two adjacent light-emitting elements 22, a distance between the light-emitting element 22 and the light-transmitting part 11 in a direction of the optical axis is ⅓ to ⅔ of the first spacing, and a curvature of the arc surface is 1 to 2 times of the first spacing, so that an area of a light spot corresponding to each light-emitting element 22 on the surface of the mask 10 away from the lamp panel 20 is as close as possible to an area of the pixel region, thereby improving the display effect of the display apparatus 100.

It should be noted that "every two adjacent light-emitting elements 22" refers to every two adjacent light-emitting elements 22 in a same row and every two adjacent light-emitting elements 22 in a same column.

In some examples, the display apparatus 100 may be used in a large-size splice display system, for example, the distance between the centers of two adjacent light-emitting elements 22 is in a range of 12 mm to 18 mm, i.e., a length of a side of the pixel region is in a range of 12 mm to 18 mm. In this case, the curvature of the arc surface of the light-transmitting part 11 may be set in a range of 18 mm to 22 mm, and the distance between the light-emitting element 22 and the light-transmitting part 11 in the direction of the optical axis may be in a range of 5 mm to 10 mm. For example, the distance between the centers of two adjacent light-emitting elements 22 is 15 mm, the curvature of the arc surface of the light-transmitting part 11 is 20 mm, and the distance between the light-emitting element 22 and the light-transmitting part 11 in the direction of the optical axis is 7 mm.

In an embodiment of the present disclosure, the plurality of light-transmitting parts 11 may be connected together to form a one-piece structure. The mask 10 may be made of a material with good light transmittance, such as polyimide film (PI), Polycarbonate (PC), polymethyl methacrylate (PMMA), or atomized glass. In addition, in order to further increase the area of the light spot formed on the mask 10, in some embodiments, a scattering particle material may be doped inside the light-transmitting part 11, so as to further scatter the light of the light-emitting element 22 irradiated on the scattering part, and simultaneously, the mask 10 may also achieve an atomization effect.

Alternatively, the scattering particles doped in the light-transmitting part 11 may be white, and the circuit board 21 may be coated with a layer of black dye, which may reduce the reflection phenomenon when the display apparatus 100 displays a black image, and may improve the contrast of image when the display apparatus 100 displays an image with a certain luminance.

As shown in FIGS. 4 and 5, in some embodiments, the light-transmitting parts 11 are arranged in multiple rows and multiple columns, and the centers of four light-transmitting parts 11 located in any two adjacent rows and any two adjacent columns define a first region A1. An orthographic projection of the light-transmitting part 11 on the lamp panel 20 is approximately circular, and in this case, it may occur that the light quantity is low at a position of the center of the first region in the mask 10. In order to improve this phenomenon, in some embodiments of the present disclosure, as shown in FIGS. 4 and 5, a light-condensing structure 12 is provided at the position of the center of at least one of the first regions A1, and the light-condensing structure 12 is used to reflect and/or refract the light for multiple times, so as to increase the light quantity at the position of the center of the first region A1 and reduce the local dark regions occurring in the display apparatus 100.

The specific form of the light condensing structure 12 is not limited in the embodiments of the present disclosure, as long as the light can be refracted and/or reflected multiple times. In one embodiment, as shown in FIGS. 4 and 5, the light-condensing structure 12 may include at least one light-condensing hole provided on the mask 10. One light-condensing hole (as shown in FIG. 4) or a plurality of light-condensing holes (as shown in FIG. 5) may be provided. After the light of light-emitting element 22 enters the arc surface, a part of the light may pass through the arc surface to get into the light-condensing hole, and is refracted and reflected at an inner wall of the light-condensing hole. The light that gets into the inside of the light-condensing hole may be reflected for multiple times in the light-condensing hole, and finally emits out of the mask 10, thereby improving the luminance of the display apparatus 100 at the position of the light-condensing hole.

The light-condensing hole may be a through hole penetrating through the mask 10 or a blind hole. In order to prolong a service life of the display apparatus 100, in some embodiments, the light-condensing hole is arranged to be a blind hole, and the blind hole opens towards the lamp panel 20 to prevent moisture, dust in the external environment from getting into the inside of display apparatus 100 and affecting the lamp panel 20.

Figure 7:
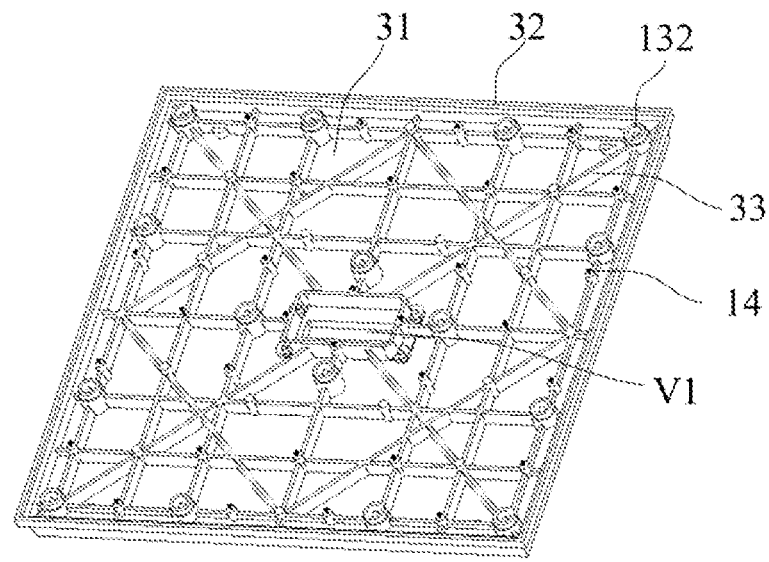
FIG. 7 is a front perspective view of a bottom housing provided in some embodiments of the present disclosure.
Figure 8:
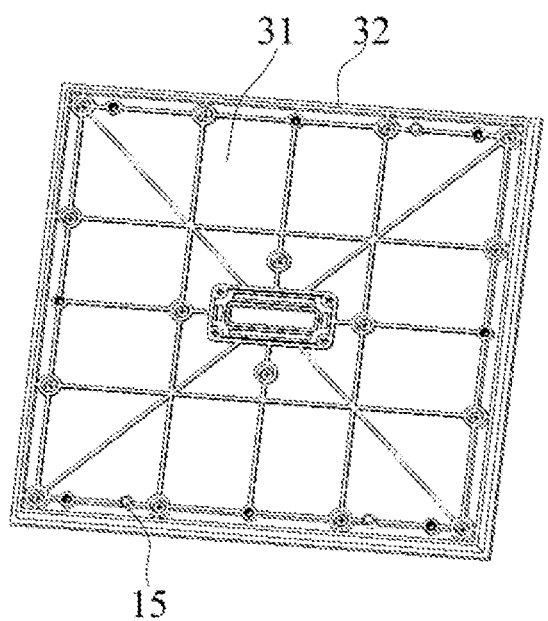
FIG. 8 is a rear perspective view of a bottom housing provided in some embodiments of the present disclosure.

As shown in FIG. 1, the display apparatus 100 further includes a bottom housing 30, the bottom housing 30 is fixedly connected to the mask 10, and the lamp panel 20 is arranged between the bottom housing 30 and the mask 10. The bottom housing 30 may be made of a material with high rigidity, such as metal. The connection between the bottom housing 30 and the mask 10 is not limited in the embodiment of the present disclosure, for example, the mask 10 and the bottom housing 30 are connected through an adhesive. FIG. 7 is a front perspective view of a bottom housing provided in some embodiments of the present disclosure. FIG. 8 is a rear perspective view of a bottom housing provided in some embodiments of the present disclosure. As shown in FIGS. 7 and 8, the bottom housing 30 includes a bottom plate 31 and a side plate 32 connected to an edge of the bottom plate 31. As shown in FIG. 3, the mask 10 includes a top plate 10a and a side plate 10b connected to an edge of top plate 10a. The top plate 10a of the mask 10 is arranged opposite to the bottom plate 31 of the bottom housing 30, and the side plate 10b of the mask 10 is connected to the side plate 32 of the bottom housing 30 through an adhesive, so that the mask 10 and the bottom housing 30 are kept fixed to each other, meanwhile, pollution and erosion of moisture and dust in the external environment to the lamp panel 20 are reduced, and the service life of the display apparatus 100 is prolonged.

The display apparatus 100 further includes a support structure supporting between the bottom housing 30 and the mask 10, one end of the support structure is arranged on the bottom housing 30, and the other end of the support structure supports the mask 10. As shown in FIG. 1, the circuit board 21 is provided with avoiding holes V0 in a one-to-one correspondence with the support structures, and the support structures pass through the avoiding holes V0, respectively. When mask 10 is subjected to a pressure applied from the external, the pressure may be transmitted to the bottom housing 30 through a support column 131, and then transmitted to an installation base for the display apparatus 100, while the lamp panel 20 between bottom housing 30 and mask 10 is not subjected to the pressure, so that the display apparatus 100 can still normally display when subjected to a large pressure. Further, the structure of arc surface of the light-transmitting part 11 contributes to the dispersion of the external force, thereby further improving the tolerance of the display apparatus 100 to the external force. In this way, the display apparatus 100 may be used in a scene of floor display, for example, in a floor screen for a performance. For another example, the display apparatus is used in a traffic road, and displays images of a zebra crossing, a dividing line, a guide line, and the like.

As shown in FIGS. 1, 4, and 5, the support structure may specifically include a support column 131 and a support sleeve 132 sleeving the support column 131. Two ends of the support column 131 are connected to the mask 10 and the bottom housing 30, respectively. One end of the support sleeve 132 is connected to the bottom housing 30, and the other end of the support sleeve 132 supports the mask 10. Through adopting such a support structure, it can improve the support stability for the mask 10. For example, the support sleeve 132 and the bottom housing 30 are formed into a one-piece structure, and the mask 10 is supported on the support sleeve 132. The support column 131 and the mask 10 are formed into a one-piece structure, and one end of the support column 131 away from the mask 10 is connected to the bottom housing 30 through a fastener such as a screw. Thus, the support stability of the support structure can be ensured, and the additional arrangement of a connecting member on the mask 10 to connect the mask 10 with the support column 131 can be omitted.

As shown in FIG. 7, the bottom housing 30 further includes a plurality of reinforcing ribs 33 arranged on the bottom plate 31, and the arrangement of the reinforcing ribs 33 can improve the firmness and the support stability of the bottom housing 30. The reinforcing ribs 33 may protrude from the bottom plate 31 and cross each other, and the support sleeve 132 may be arranged in the reinforcing rib 33. The bottom plate 31, the side plate 32, the reinforcing rib 33, and the support sleeve 132 of the bottom housing 30 may be formed into a one-piece structure.

An orthographic projection of the support structure on the mask 10 is located outside a region where the light-transmitting part 11 is located, so that the support structure can stably support the mask 10, and does not affect the light scattering effect of the light-transmitting part 11.

Alternatively, a plurality of support structures may be provided. An orthographic projection of each support structure on the mask 10 is located at a position of the center of the above-described first region A1, and orthographic projections of different support structures on the mask 10 are located at different first regions A1. Alternatively, in the mask 10, the support columns 131 are arranged in a part of the first regions A1, and the light concentrating structures 12 are arranged in the other part of the first region A1.

In order to stabilize the lamp panel 20 between the bottom housing 30 and the mask 10, in some embodiments, the circuit board 21 of the lamp panel 20 may be connected to the bottom housing 30 through a connecting member. For example, the circuit board 21 is provided with screws, the reinforcing rib 33 of the bottom housing 30 is provided with screw holes, and the circuit board 21 is connected to the reinforcing rib 33 through the screws. For another example, the circuit board 21 is connected to the bottom housing 30 through a double-sided tape.

In addition, as shown in FIG. 3, the surface of the mask 10 away from the lamp panel 20 is provided with an anti-slip structure 16, and the anti-slip structure 16 includes protrusions and/or grooves. In this case, when the display apparatus 100 is used in a floor screen in a performance or other scenes, the anti-slip structure 16 can increase a friction between a person and the mask 10, thereby ensuring the safety of the person.

In some embodiments, the anti-slip structures 16 may be arranged between any two adjacent rows of the light-transmitting parts 11 and between any two adjacent columns of the light-transmitting parts 11, in which case, the anti-slip structures 16 on the mask 10 cross each other to form a mesh structure, and each mesh of the mesh structure is provided with one light-transmitting part 11.

In some examples, the anti-slip structure 16 may be a groove, a width of the groove may be in a range of 0.2 mm to 0.4 mm, and a depth of the groove may be a range of 0.1 mm to 0.3 mm to prevent excessive dust and the like from being accumulated in the groove. For example, the groove has a width of 0.3 mm and a depth of 0.2 mm. It should be noted that the width of the groove between two adjacent rows of light-transmitting parts 11 refers to a size of the groove in a column direction; the width of the groove between two adjacent columns of the light-transmitting parts 11 refers to a size of the groove in a row direction.

Figure 9:
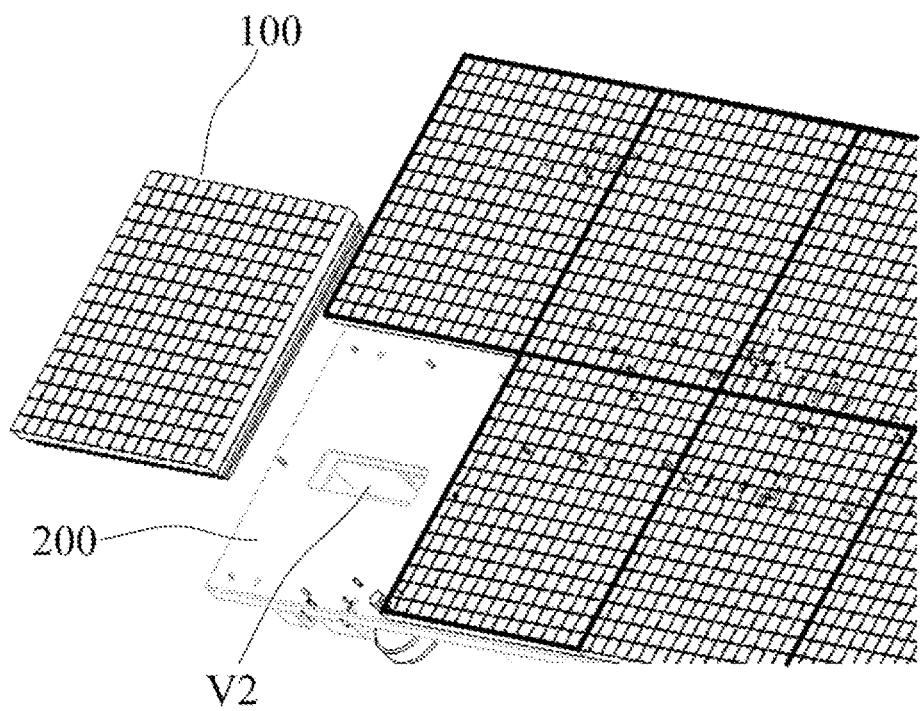
FIG. 9 is a schematic diagram of a splice display system provided in some embodiments of the present disclosure.

An embodiment of the present disclosure further provides a splice display system. FIG. 9 is a schematic diagram of the splice display system provided in some embodiments of the present disclosure. As shown in FIG. 9, the splice display system includes a fixing plate 200 and a plurality of display apparatuses 100 arranged on the fixing plate 200. The display apparatus 100 adopts the display apparatus 100 in any of the above embodiments.

In some embodiments, a shape of an orthographic projection of each display apparatus 100 on the fixing plate 200 may be a rectangle. For example, the rectangle may have a length and a width both in a range of 200 mm to 400 mm, for example, the rectangle may have a length and a width of 250 mm. The plurality of display apparatuses 100 may be distributed in an array. When displaying images, each frame of the images may be collectively displayed by the plurality of display apparatuses 100. In order to improve the viewing experience of the viewer, a spacing between every two adjacent display apparatuses 100 may be set to a small value. For example, the spacing between every two adjacent display apparatuses 100 is less than or equal to the distance between centers of two adjacent light-emitting elements 22 in a same display apparatus 100.

The fixing plate 200 may serve as an installation base of the display apparatus 100, and when the mask 10 of the display apparatus 100 is subjected to a pressure, the pressure is transmitted to the bottom housing 30 through the support columns 131, and then transmitted from the bottom housing 30 to the fixing plate 200. The bottom housing 30 may be made of a metal material, so that the bottom housing 30 has a high load-bearing capacity. For example, the bottom housing 30 may be made of an aluminum alloy material.

Each display apparatus 100 is fixed to the fixing plate by a connecting member such as a screw. For example, the fixing plate is provided with screws, and the bottom housing 30 is provided with screw holes corresponding to the screws, and the screws are fixed in the screw holes, respectively.

In addition, the bottom housing 30 may further be provided with a positioning pin 15 (as shown in FIG. 8), and the fixing plate 200 is provided with a positioning hole matching with the positioning pin 15, so that the positioning pin 15 may be inserted into or separated from the positioning hole. When the display apparatus 100 is installed on the fixing plate 200, the display apparatus 100 may be first placed on the fixing plate 200 with the positioning pins 15 inserted into the positioning holes, so that the position of the display apparatus 100 on the fixing plate 200 remains fixed. Then, the display apparatus 100 is fixedly connected to the fixing plate 200 through a fixing member.

The positioning pin 15 and the positioning hole are not limited to the above arrangement. Alternatively, the positioning pin 15 may be arranged on the fixing plate, and the positioning hole may be arranged in the bottom housing 30.

In some embodiments, the splice display system may further include a control module, which provides a control signal to the driving chip of each display apparatus 100 according to the image signal and the power signal provided by the signal source, so that the driving chip controls the light-emitting elements 22 to emit light according to the control signal, and the display apparatus 100 displays a corresponding image.

Alternatively, the plurality of light-emitting elements 22 in each display apparatus 100 may be divided into N number of groups, and N number of driving chips are arranged on the circuit board 21 of the display apparatus 100, each driving chip being electrically connected to one group of light-emitting elements 22, and different driving chips are connected to different groups of light-emitting elements 22. Correspondingly, the splice display system includes N number of control modules, an $i^{th}$ driving chip in each display apparatus 100 is electrically connected to an $i^{th}$ control module, both of i and N are a positive integer, N>1, and $1 \leq i \leq N$. Each control module is configured to receive an image signal and a power signal provided by the signal source, and to provide a control signal to the driving chip connected to the control module according to the image signal and the power signal. Each of the driving chips is configured to provide a driving current to the corresponding light-emitting element 22 according to the received control signal, thereby driving the corresponding light-emitting element 22 to emit light.

For example, the signal source may include a server for providing the image signal and a voltage source for providing a voltage signal, different control modules may be connected to different signal sources, respectively. The image signal is a signal for characterizing image information (e.g., the image information including a luminance of each pixel). The image signal may be a TCP/IP signal. The control module may perform signal encoding and decoding on the received image signal to obtain a control signal corresponding to the to-be-emitted light intensity of each group of light-emitting elements 22 in each display apparatus 100, where the control signal may be an SPI (Serial Peripheral Interface) signal.

In an embodiment of the present disclosure, each driving chip and the group of light-emitting elements 22 and the control module connected thereto may be regarded as one display path, and when a device (for example, the light-emitting element 22 and the driving chip) in one display path fails, devices of other display paths may operate normally, so as to ensure that the splice display system can still perform continuous display, and enhance the reliability of the system.

Figure 10:
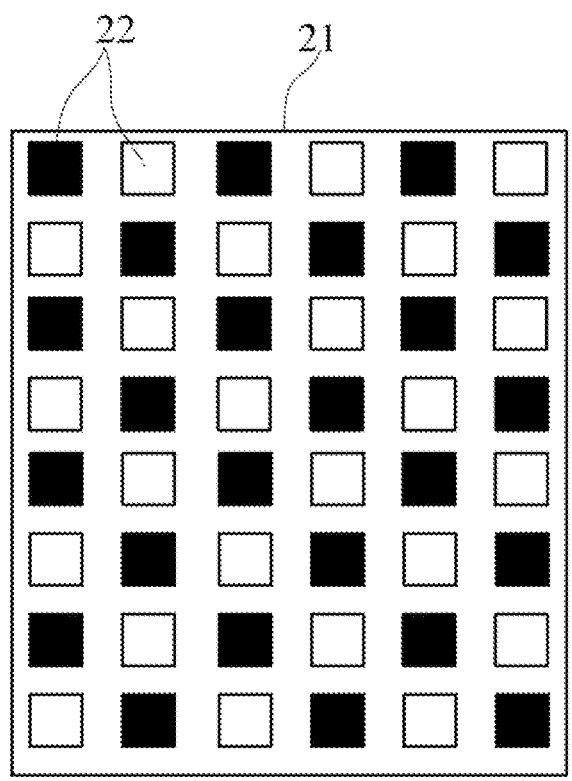
FIG. 10 is a schematic diagram of a distribution of two groups of light-emitting elements in a display apparatus provided in some embodiments of the present disclosure.

In some embodiments, N=2, that is, the plurality of light-emitting devices in each display apparatus 100 are divided into two groups. FIG. 10 is a schematic diagram of a distribution of two groups of light-emitting elements in a display apparatus provided in some embodiments of the present disclosure. In FIG. 10, the light-emitting devices 22 are distributed in an array, the light-emitting elements 22 of different groups are represented by squares of different color, respectively. As shown in FIG. 10, the first group of light-emitting devices include light-emitting elements 22 located in odd-numbered rows and odd-numbered columns, and light-emitting elements 22 located in even-numbered rows and even-numbered columns; the second group of light-emitting elements 22 includes light-emitting elements 22 located in odd-numbered rows and even-numbered columns, and light-emitting elements 22 located in even-numbered rows and odd-numbered columns. In this case, when only one group of the light-emitting elements 22 emit light, a viewer at a distance can still see a substantially complete image.

It should be noted that FIG. 10 is only for illustrating the arrangement and grouping of the light-emitting elements 22, and does not indicate that the shape of the light-emitting elements 22 is a rectangle as shown in FIG. 10.

Figure 11:
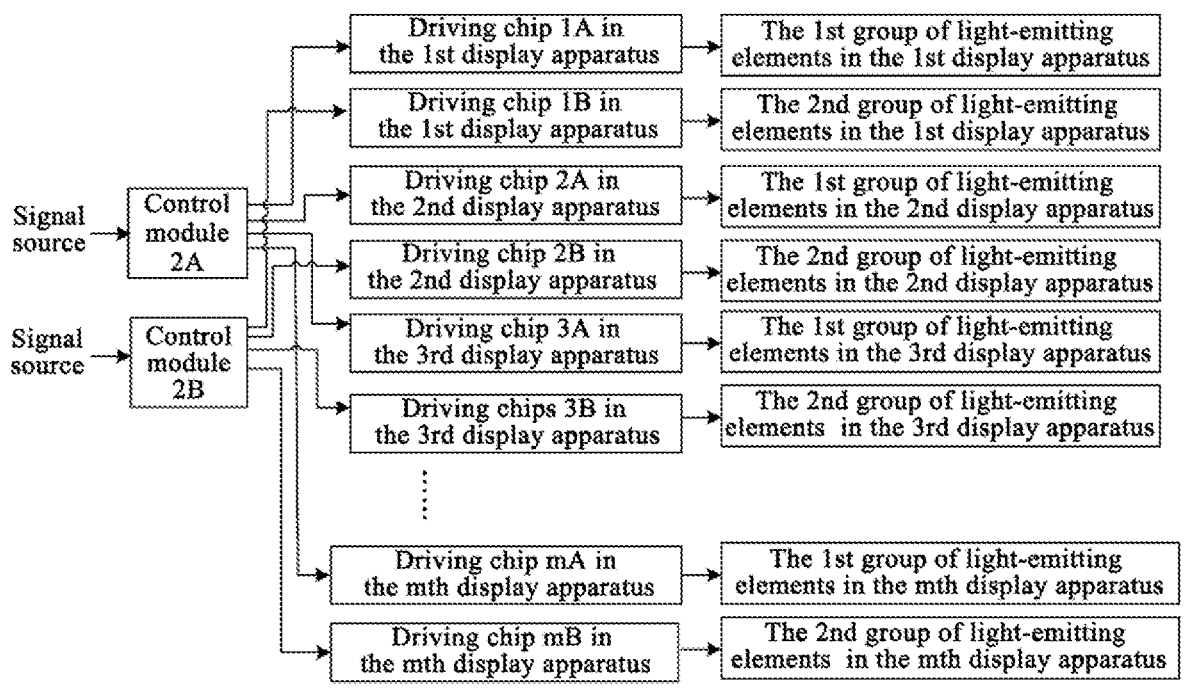
FIG. 11 is a schematic diagram of signal transmission in a display system provided in some embodiments of the present disclosure.

FIG. 11 is a schematic diagram of signal transmission in a splice display system provided in some embodiments of the present disclosure, and FIG. 11 illustrates an example of dividing the light-emitting elements 22 in the display apparatus into two groups, where the splice display system includes m number of display apparatuses, and m is an integer greater than 1. As shown in FIG. 11, the control module 2A provides control signals for the driving chip 1A in the $1^{st}$ display apparatus, the driving chip 2A in the $2^{nd}$ display apparatus, the driving chip 3A in the $3^{rd}$ display apparatus, . . . , and the driving chip mA in the $m^{th}$ display apparatus, according to the image signal and the power signal provided by the corresponding signal sources. The control module 2B provides control signals for the driving chip 1B in the 1st display apparatus, the driving chip 2B in the 2nd display apparatus, the driving chips 3B in the 3rd display apparatus, . . . , and the driving chip mB in the mth display apparatus, according to the image signal and the power signal provided by the corresponding signal source. The driving chips 1A and 1B in the 1st display apparatus control the 1st group and the 2nd group of light-emitting elements 22 in the 1st display apparatus to emit light according to the received control signals, respectively; the driving chips 2A and 2B in the 2nd display apparatus control the 1st group and the 2nd group of light-emitting elements 22 in the 2nd display apparatus to emit light according to the received control signals, respectively; and so on, so that the splice display system displays images.

It should be noted that the light-emitting elements 22 in the display apparatus 100 may be grouped in other ways, for example, the first group of light-emitting elements 22 include light-emitting elements 22 in odd-numbered rows, and the second group of light-emitting elements 22 include light-emitting elements 22 in even-numbered rows. For another example, the light-emitting elements 22 in the 1st to 2nd columns, the 5th to 6th columns, the 9th to 10th columns, the 13th to 14th columns, . . . , in all the odd-numbered rows and the light-emitting elements 22 in the 3rd to 4th columns, the 7th to 8th columns, the 11th to 12th columns, . . . , in all the even-numbered rows are grouped into the first group; and the light-emitting elements 22 in the 3rd to 4th columns, the 7th to 8th columns, the 11th to 12th columns, . . . , in all the odd-numbered rows and the light-emitting elements 22 1st to 2nd columns, the 5th to 6th columns, the 9th to 10th columns, the 13th to 14th columns, . . . , in all the even-numbered rows grouped into the second group.

In some embodiments, a connector is further arranged on the circuit board 21, and each driving chip is connected to a corresponding control module through the connector. As shown in FIGS. 7 and 9, the bottom housing 30 of the display apparatus is provided with a first through hole V1, and the fixing plate 200 is provided with second through holes V2 in a one-to-one correspondence with the first through holes V1. The control module may be arranged at a side of the fixing plate 200 away from the display apparatus 100 and be connected to the connector through a signal line.

At least a part of the connector may be located in the first through hole V1, and a sealing ring is arranged between the connector and an inner wall of the first through hole to prevent external moisture and dust from getting into the inside of the display apparatus 100.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

What is claimed is:

1. A display apparatus, comprising:
   a lamp panel, which comprises a circuit board and a plurality of light-emitting elements on the circuit board; and
   a mask on side of the plurality of light-emitting elements away from the circuit board, wherein the mask comprises a plurality of light-transmitting parts corresponding to the plurality of light-emitting elements, an orthographic projection of each of the plurality of light-emitting elements on the circuit board is within an orthographic projection of a corresponding light-transmitting part on the circuit board, each of the plurality of light-transmitting parts comprises a concave lens, and a surface of the concave lens close to a light-emitting element is a concave arc surface,
   wherein the light-emitting element is on an optical axis of the concave lens,
   wherein a first spacing exists between centers of every two adjacent light-emitting elements, a distance between the light-emitting element and a light transmitting part in a direction of the optical axis is ⅓ to ⅔ of the first spacing, and a curvature of the arc surface is 1 to 2 times of the first spacing.

2. The display apparatus according to claim 1, wherein the first spacing between the centers of every two adjacent light-emitting elements is in a range of 12 mm to 18 mm, the distance between the light-emitting element and the light-transmitting part in the direction of the optical axis is in a range of 5 mm to 10 mm, and the curvature of the arc surface is in a range of 18 mm to 22 mm.

3. The display apparatus according to claim 1, wherein a scattering particle material is doped inside the light-transmitting part.

4. The display apparatus according to claim 1, wherein the plurality of light-transmitting parts of the mask are in a plurality of rows and a plurality of columns, centers of four light-transmitting parts in any two adjacent rows and any two adjacent columns define a first region, and a light-condensing structure at a position of a center of at least one of the first regions, and the light-condensing structure is configured to reflect and/or refract light for multiple times.

5. The display apparatus according to claim 4, wherein the light-condensing structure comprises at least one light-condensing hole in the mask.

6. The display apparatus according to claim 1, wherein the plurality of light-transmitting parts are formed into a one-piece structure.

7. The display apparatus according to claim 1, wherein the display apparatus further comprises:
   a bottom housing, wherein the bottom housing is fixedly connected to the mask, and the lamp panel is between the bottom housing and the mask; and
   a support structure supporting between the mask and the bottom housing, wherein the circuit board is provided with an avoiding hole corresponding to the support structure, and the support structure passes through the avoiding hole.

8. The display apparatus according to claim 7, wherein the support structure comprises:
   a support column, wherein two ends of the support column are connected to the mask and the bottom housing, respectively; and
   a support sleeve, wherein the support column is sleeved by the support sleeve, one end of the support sleeve is connected to the bottom housing, and the other end of the support sleeve supports the mask.

9. The display apparatus according to claim 7, wherein the mask is connected to the bottom housing through an adhesive.

10. The display apparatus according to claim 7, wherein the bottom housing comprises a bottom plate and a plurality of reinforcing ribs on the bottom plate.

11. The display apparatus according to claim 1, wherein a surface of the mask away from the lamp panel is provided with an anti-slip structure, and the anti-slip structure comprises a protrusion and/or a groove.

12. The display apparatus according to claim 11, wherein the light-transmitting parts are in an array, and the anti-slip structure is arranged between any two adjacent rows of the light-transmitting parts and between any two adjacent columns of the light-transmitting parts.

13. The display apparatus according to claim 12, wherein the anti-slip structure comprises a groove having a width in a range of 0.2 mm to 0.4 mm and a depth in a range of 0.1 mm to 0.3 mm.

14. A splice display system, comprising a fixing plate and a plurality of display apparatuses on the fixing plate, the plurality of display apparatuses comprises the display apparatus according to claim 1.

15. The splice display system according to claim 14, wherein one of the bottom housing of the display apparatus and the fixing plate is provided with a positioning pin, and the other of the bottom housing of the display apparatus and the fixing plate is provided with a positioning hole corresponding to the positioning pin, and the positioning pin is in the positioning hole.

16. The splice display system according to claim 14, wherein the plurality of light-emitting elements in each of the plurality of display apparatuses are divided into N number of groups, and N number of driving chips are on the circuit board in the display apparatus, each of the N number of driving chips is electrically connected to one group of light-emitting elements, and different driving chips are connected to different groups of light-emitting elements, respectively;

the splice display system further comprises N number of control modules, an $i^{th}$ driving chip in each display apparatus is electrically connected to an $i^{th}$ control module, both of i and N are positive integers, N>1, and 1≤i≤N;

wherein each of the N number of control modules is configured to receive an image signal and a power signal provided by a signal source, and to provide a control signal for each driving chip connected to the control module according to the image signal and the power signal; and the driving chip is configured to drive a corresponding light-emitting element to emit light according to the control signal received from the control module.

17. The splice display system according to claim 16, wherein the plurality of light-emitting elements in each of the plurality of display apparatuses are in an array, Nis 2; a first group of light-emitting elements comprise light-emitting elements in odd-numbered rows and odd-numbered columns, and light-emitting elements in even-numbered rows and even-numbered columns; and a second group of light-emitting elements comprise light-emitting elements in odd-numbered rows and even-numbered columns, and light-emitting elements in even-numbered rows and odd-numbered columns.

18. The splice display system according to claim 16, wherein a connector is further on the circuit board, each of the N number of driving chips is connected to a corresponding control module through the connector, and a through hole is in a bottom housing of the display apparatus, at least a part of the connector is in the through hole, and a sealing ring is between the connector and an inner wall of the through hole.

* * * * *